United States Patent [19]

Pere

[11] Patent Number: 4,488,437

[45] Date of Patent: Dec. 18, 1984

[54] PROCESS FOR TIGHTENING OF A JOINT HAVING A THREADED JOINT ELEMENT

[75] Inventor: Christian Pere, Maroc, France

[73] Assignee: Regie Nationale des Usines Renault, Boulogne-Billancourt, France

[21] Appl. No.: 496,641

[22] Filed: May 20, 1983

[30] Foreign Application Priority Data

May 26, 1982 [FR] France ................ 82 09108

[51] Int. Cl.$^3$ ................ F16B 31/02

[52] U.S. Cl. ................ 73/761; 29/240

[58] Field of Search ................ 73/761; 29/240, 407

[56] References Cited

U.S. PATENT DOCUMENTS

| | | | |
|---|---|---|---|
| 4,016,938 | 4/1977 | Rice | 73/761 |
| 4,142,266 | 3/1979 | Dahl | 73/761 |
| 4,375,121 | 3/1983 | Sigmund | 73/761 |
| 4,375,123 | 3/1983 | Ney | 73/761 |

*Primary Examiner*—Anthony V. Ciarlante
*Attorney, Agent, or Firm*—Oblon, Fisher, Spivak, McClelland & Maier

[57] ABSTRACT

A process is disclosed for tightening a joint having a threaded joint element. This invention makes it possible to apply a predetermined tightening force to the joint. The process uses the real factor of proportionality (K) between the force for tightening the joint and the screwing torque applied to the threaded element which is determined after a preliminary screwing cycle and unscrewing cycle have been performed. Application is particularly to automation of tightening of prestressed joints.

10 Claims, 1 Drawing Figure

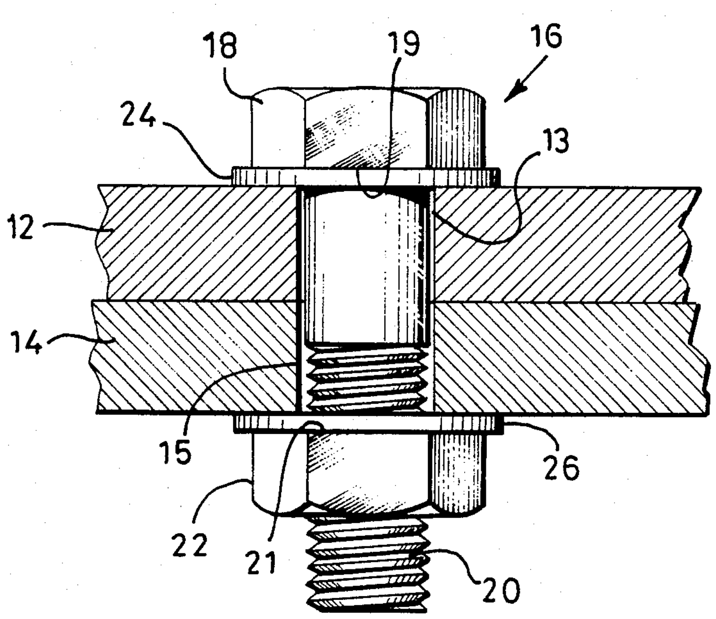
18
19
16
24
13
12
14
15
26
22
21
20

PROCESS FOR TIGHTENING OF A JOINT HAVING A THREADED JOINT ELEMENT

BACKGROUND OF THE INVENTION

1. Field of the Invention

This invention relates to a process for the tightening of a joint having a threaded joint element, for applying a predetermined tightening force to this joint.

2. Description of the Prior Art

All the tightening processes currently used for holding joints together by means of a threaded joint element operate by applying to these joints a predetermined tightening force on which the holding of the joint depends during its use.

Among the known tightening processes, there are:

Torque screwing. This is by far the most used method. It consists of screwing the joint element until a given resisting torque is obtained. It is easy to use since all that is required is a torque wrench or, for automation on the assembly line, a torquemeter is placed in the screwing assembly line and screwing is stopped when the specified torque has been measured. Unfortunately, variations in the prestressed force are very large because the friction coefficient upon which the torque resistance depends is extremely variable. It has been attempted to eliminate this serious drawback by using a solid lubricant at the site of the threads, such lubrication resulting from the application of special varnishes, but the treatment of the bolt and the nut greatly increases the cost of the joint.

Angle screwing. The principle of angle screwing is simple. It consists of detecting the contact of the parts of the joint by observing the rise in torque, then in screwing by a predetermined angle. The determination of tightness by the calculation of the angle provides only a very approximate value because it is difficult to have all the parameters come into play in a uniform manner (the calculation of the rigidity of the joint is delicate).

To determine the predetermined angle, a series of bolts equipped with gauges which measure the prestressed force can be screwed and the average of the angles obtained can be used. Another method consists of using a control joint and a comparator which measures the elongation of the bolt, which is proportional to the prestressed force. The variations of rigidity are small from one sample to another and this method provides better results than the torque control. The main problem being, however, the detection of the rise in torque which serves as a starting point for the evaluation of the angle.

Elastic limit screwing. This method consists of stopping the screwing when the elastic limit of the threaded joint element is reached. To do this, after noting on the curve showing screwing torque as a function of the angle of rotation of the joint element that screwing in the elastic range corresponds to a linear rise in torque, the torque gradient is considered in relation to the angle. The torque gradient is constant in the elastic range and falls suddenly in the plastic range. Therefore, all that is required is to use a relatively simply system to detect the drop of the torque gradient.

However, the use of elastic limit screwing has the drawbacks of requiring that the joint is at its limit, of requiring only the use of screws and bolts whose quality is thoroughly known, and of preventing the insertion of washers because the possible resulting sliding of the joint impairs detection of the gradient drop.

SUMMARY OF THE INVENTION

The present invention has as its object a tightening process which eliminates the drawbacks of the known methods of the prior art.

With this in view, the present invention proposes a process having the following steps:

A first step consists of applying a preliminary screwing cycle to said joint element.

A second step consists of measuring the screwing torque applied to the joint element as a function of the angular displacement of the joint element during application of said preliminary screwing cycle.

A third step consists of applying a preliminary unscrewing cycle to the element.

A fourth step consists of measuring the screwing torque applied to the joint element as a function of the angular displacement of the joint element during the application of the preliminary unscrewing cycle.

A fifth step consists of calculating the real factor of proportionality linking the tightening force of the joint to the screwing torque applied to said joint element as a function of the results obtained during the second and fourth steps.

A sixth step consists of calculating the final screwing torque to be applied to the joint element to obtain the predetermined tightening force as a function of the real factor of proportionality.

A seventh step consists of applying the final screwing torque to the joint element.

The process according to the invention has the main advantage of identifying, for each joint made, the real factor of proportionality linking the tightening force to the screwing torque.

Moreover, the process according to the invention has the advantage of being able to be easily substituted for the process using the torque screwing method without modification of the joint or additional study of the joint. This substitution is not possible in either elastic limit screwing which requires a precise design of the screw, or in angle screwing which requires a preliminary study and numerous and costly tests.

During the design of the joint, all that is required is to determine the predetermined tightening force that is desired to be applied and it is not necessary to calculate beforehand the value of the screwing torque that must be applied to obtain a predetermined tightening force.

BRIEF DESCRIPTION OF THE DRAWING

The invention will now be described in detail with reference to the accompanying drawing in which the Sole FIGURE represents a joint to which the invention can be applied.

DESCRIPTION OF THE PREFERRED EMBODIMENTS

There is shown in the FIGURE a standard joint comprising two plane parts 12 and 14 to be joined by a threaded joint element. In the example shown, threaded element 14 consists of a bolt 16 comprising a head 18, a threaded shank 20 and a nut 22. Threaded shank 20 is received in two bores 13 and 15 made in parts 12 and 14. There has also been provided a first washer 24 located between lower face 19 of bolt head 18 and the opposing upper face of part 12, and a second washer 26 placed between upper face 21 of nut 22 and the opposing lower face of part 14.

In a joint such as shown in the FIGURE, the approximate relationship of the screwing torque Cv to be applied to the joint to a predetermined axial tightening force F between the parts to be joined can be given by the following formula:

$$Cv = \left(\frac{P}{2\pi} + u\,D\right) \times F \qquad (1)$$

in which:

Cv = screwing torque, p = pitch of the thread of the threaded element, u = average friction factor of the joint, D = equivalent mechanical advantage of the tangential force due to friction, F = predetermined axial tightening force.

Therefore, for a given joint to which particular values of u and D pertaining to this joint correspond, there is a formula of the type:

$$F = K \times Cv \qquad (2)$$

in which K is a constant proportionality factor.

During unscrewing formula (1) becomes:

$$Cd = \left(-\frac{P}{2\pi} + \mu\,D\right) \times F \qquad (3)$$

If the torque is considered as a function of the force, it is found, therefore, that there is a hysteresis between the screwing and the unscrewing, and by combining the formulas (1) and (3), the following formula is obtained:

$$Cv - Cd = \frac{P}{\pi} \times F \qquad (4)$$

The principle of the process of this invention is to identify the real coefficient of proportionality K for each joint resulting from the existence of said hysteresis.

By combining the formulas (2) and (4), the following formula is obtained:

$$K = \frac{\pi(Cv - Cd)}{p\,Cv}$$

Therefore, the invention proposes using the following process:

First, applying a preliminary screwing cycle to the joint element. Second, measuring the screwing torque Cv applied to the joint element as a function of the angular displacement of the joint element during the application of the preliminary screwing cycle. Third, applying a preliminary unscrewing cycle to the element. Fourth, measuring the unscrewing torque Cd applied to the joint element as a function of the angular displacement of the joint element during the application of the preliminary unscrewing cycle. Fifth, calculating the real factor of proportionality K linking the tightening force of the joint to the screwing torque applied to the joint element as a function of the results obtained during the second and fourth steps. Sixth, calculating the final screwing torque Cf to be applied to the joint element to obtain the predetermined tightening force F as a function of the real factor of proportionality K. Seventh, applying the final screwing torque Cf to the joint element.

According to a first embodiment, the fifth step comprises the following intermediate steps:

First, noting the value of the screwing torque C'v applied to the joint element at the end of the preliminary screwing cycle. Second, taking the value of the unscrewing torque C'd applied to the joint element at the beginning of the preliminary unscrewing cycle. Third, calculating the real factor of proportionality K as a function of the values of the screwing and unscrewing torques C'v, C'd noted in the first and second intermediate steps.

In this first embodiment, during the third intermediate step, the real factor of proportionality K is calculated with the following formula:

$$K = \frac{\pi(C'v - C'd)}{P\,C'v} \qquad (5)$$

Once K is calculated, all that remains is to calculate Cf with the formula:

$$F = K \times Cf$$

According to a second embodiment of the invention, and considering that the rigidity of the joint is constant or else that the law for variation of this rigidity is known, the fifth step comprises the following intermediate steps:

First, calculating the gradient Gv of the curve of the screwing torque as a function of the angular displacement of the joint element established from the results obtained during the second measurement step. Second, calculating the gradient Gd of the curve of the unscrewing torque as a function of the angular displacement of the joint element established from the results of the first measurement step. Third, calculating said real factor of proportionality K as a function of the values of gradients Gv, Gd calculated in the first and second intermediate steps.

The gradient Gv is given by the formula:

$$Gv = \delta Cv/\delta\theta \qquad (6)$$

in which $\theta$ is the angular displacement of the screwing element.

Likewise, Gd is given by the formula:

$$Gd = \delta Cd/\delta\theta \qquad (7)$$

In this second embodiment, during the third intermediate step, the real factor of proportionality K must be calculated by using the following formula:

$$K = \frac{\pi(Gv - Gd)}{p \times Gv}$$

Although the two embodiments which have just been described give good results, these embodiments can be improved by repeating the first through fifth steps n times and by calculating the real factor of proportionality K by using any suitable statistical method such as, for example, the average method, the method of least squares, etc.

To obtain the greatest possible precision as to the value of K, it is desirable that the final value of the screwing torque, during the preliminary cycle of screwing, be equal to about 80% of the approximate value of Cf that can be calculated during the design of the joint.

Likewise, when the first through fifth steps are repeated at least two times, it is desirable to apply the first time a final value of the screwing torque corresponding to the approximate value of Cf that can be calculated during the design of the joint by taking for $\mu$ the minimum estimated value of this factor. During the second cycle, it is then desirable to apply a screwing torque whose final value at the end of the first step corresponds to about 80% of the value Cf which could be calculated at the end of the first through fifth steps of the first cycle.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for tightening a joint having a threaded joint element for applying to this joint a predetermined tightening force, said process comprising the steps of:
   - (a) first, applying a preliminary screwing cycle to said joint element;
   - (b) second, measuring the screwing torque (Cv) applied to said joint element as a function of the angular displacement of said joint element, during the application of said preliminary screwing cycle;
   - (c) third, applying a preliminary unscrewing cycle to said element;
   - (d) fourth, measuring an unscrewing torque (Cd) applied to said joint element as a function of the angular displacement of said joint element during the application of said preliminary unscrewing cycle;
   - (e) fifth, calculating a real factor of proportionality (K) between the tightening force of said joint and the screwing torque applied to said joint element, as a function of results obtained during said second and fourth steps;
   - (f) sixth, calculating a final screwing torque (Cf) to be applied to said joint element to obtain said predetermined tightening force (F), as a function of said real factor of proportionality (K); and
   - (g) seventh, applying said final screwing torque (Cf) to said joint element.

2. The process for tightening as in claim 1, wherein said first through fifth steps are repeated n times, said real factor of proportionality (K) being obtained statistically from n values of the factor (K) calculated during said n fifth steps.

3. The process for tightening as in claim 2, wherein said fifth step comprises the following intermediate steps:
   - first, noting a value of said screwing torque (C'v) applied to said joint element at the end of said preliminary screwing cycle;
   - second, taking the value of an unscrewing torque (C'd) applied to said joint element at the end of said preliminary unscrewing cycle; and
   - third, calculating said real factor of proportionality (K) as a function of the values of said screwing and unscrewing torques (C'v, C'd) of said first and second intermediate steps.

4. The process for tightening as in claim 3, wherein during said third intermediate step, the real factor of proportionality (K) is calculated with the following formula:

$$K = \frac{\pi(Cv - Cd)}{p \times Cv}$$

wherein p is a pitch of the threading of said joint element.

5. The process of tightening as in claim 2, wherein said fifth step comprises the following intermediate stages;
   - first, calculating a gradient (Gv) of a curve of said screwing torque as a function of the angular displacement of said joint element, said curve being derived from results obtained during said second step;
   - second, calculating a gradient (Gd) of a curve of said unscrewing torque as a function of the angular displacement of said joint element, said curve being derived from results of said fourth step; and
   - third, calculating said real factor of proportionality (K) as a function of said values of said gradients (Gv) and (Gd) calculated during said first and second intermediate steps.

6. The process for tightening as in claim 5, wherein during said third intermediate step the real factor of proportionality (K) is calculated with the following formula:

$$K = \frac{\pi(Gv - Gd)}{p \times Gv}$$

wherein p is a pitch of the threading of said joint element.

7. The process for tightening as in claim 1, wherein said fifth step comprises the following intermediate steps:
   - first, noting a value of said screwing torque (C'v) applied to said joint element at the end of said preliminary screwing cycle;
   - second, taking the value of an unscrewing torque (C'd) applied to said joint element at the end of said preliminary unscrewing cycle; and
   - third, calculating said real factor of proportionality (K) as a function of the values of said screwing and unscrewing torques (C'v, C'd) of said first and second intermediate steps.

8. The process for tightening as in claim 7, wherein during said third intermediate step, the real factor of proportionality (K) is calculated with the following formula:

$$K = \frac{\pi(Cv - Cd)}{p \times Cv}$$

wherein p is a pitch of the threading of said joint element.

9. The process for tightening as in claim 1, wherein said fifth step comprises the following intermediate stages:
   - first, calculating a gradient (Gv) of a curve of said screwing torque as a function of the angular displacement of said joint element, said curve being derived from results obtained during said second step;
   - second, calculating a gradient (Gd) of a curve of said unscrewing torque as a function of the angular displacement of said joint element, said curve being derived from results of said fourth step; and third, calculating said real factor of proportionality (K) as a function of said values of said gradients (Gv) and (Gd) calculated during said first and second intermediate steps.

10. The process for tightening as in claim 9, wherein during said third intermediate step, the real factor of proportionality (K) is calculated with the following formula:

$$K = \frac{\pi(Gv - Gd)}{p \times Gv}$$

wherein p is a pitch of the threading of said joint element.

* * * * *